Patented Oct. 8, 1940

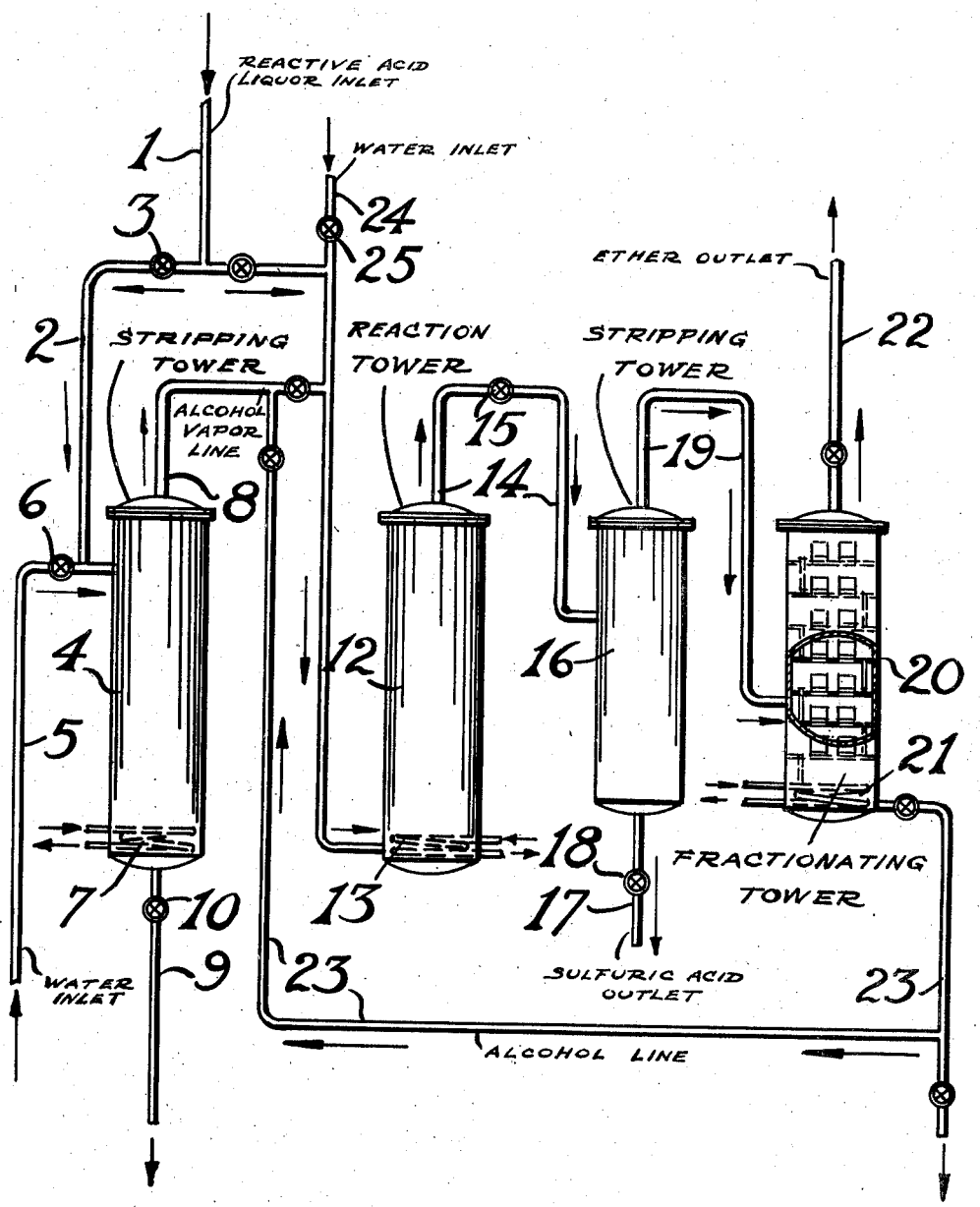

2,216,931

UNITED STATES PATENT OFFICE 2,216,931

ETHERS FROM REACTIVE ACID LIQUOR

Francis M. Archibald, Elizabeth, and Helmuth G. Schneider, Roselle, N. J., assignors to Standard Alcohol Company Application April 21, 1938, Serial No. 203,266

6 Claims. (Cl. 260—614)

This invention relates to an improvement in the manufacture of ethers, and more particularly to the production of ethers from the reactive acid liquors prepared by the absorption of olefins in sulfuric acids.

This application is a continuation-in-part of U. S. application S. N. 83,896 filed June 6, 1936, now U. S. Patent No. 2,131,030 issued September 27, 1938.

Ethers are prepared from alcohols or olefins by dissolving the alcohols or olefins in acids and distilling off ethers that are formed. The formation of ethers when prepared from alcohols and acid or dissolved olefins and acid (extract) is an equilibrium reaction. At any given acid strength the conversion of ethers is increased by raising the olefin or alcohol to acid mol ratio. Temperatures from 28° to 100° C. have only very slight effect on the equilibrium.

The conversion to ethers is favored for any given acid strength by having a large excess of alcohol present as can be seen from the following experimental results:

| Mol ratio of: $\dfrac{\text{Isopropyl alcohol}}{60\% \, H_2SO_4}$ | Conversion of alcohol to ether |
|---|---|
| | Percent |
| 0.67 | 7 |
| 1.50 | 15 |
| 3.05 | 36 |
| 4.15 | 50 |

It has been found that the equilibrium at any temperature was more rapidly reached from the ether-acid and olefin-acid side than from the alcohol-acid side. The concentration of the acid used has a great effect on the reaction. Where sulfuric acid is used, an acid of 50 to 60% effective strength is preferred. When higher concentrations of sulfuric acid are used, the formation of polymers is greatly increased and with weaker acids, ether formation is very slow, although it is possible by raising the temperature to increase the ether formation rate, since the temperature coefficient of the ether-forming reaction is high. These observations apply to the so-called batch process. Where a continuous process is employed, the acid concentration in the absorbent medium can be higher without formation of polymers because of the shorter time of contact between the olefin and the acid. Acids as low as 30% concentration have been used and gave satisfactory results. While sulfuric acid is the preferred catalyst, other materials may be used as well, for example, phosphoric acid, hydrochloric acid, etc. with their concentrations adjusted to form alkyl esters more readily.

When olefins are absorbed in sulfuric acid of 80 to 95% concentration, a reactive acid liquor is obtained. This reactive acid liquor is diluted usually to 20 or 40% to hydrolyze and on distillation, alcohols with a small amount of ether are obtained. According to this invention, the reactive acid liquor is not greatly diluted but only partially, i. e., 45 to 65% concentration, and upon heating of this partially diluted reactive acid liquor, a greater proportion of ethers is obtained than by the former method. When acids of 60 to 80% are used as the absorbent medium, the reactive acid liquor formed when diluted to 40 to 65% concentration and heated, produces ethers in yield equivalent to that obtained when 80 to 95% acid is used as the absorbent medium, the amount of dilution being always governed by the concentration of the acid used for absorption and the concentration of acid reactant liquor desired. The yield of ether obtained in all cases is governed by the mol ratio of olefine to acid in the extract, the higher this ratio, the greater the conversion to ether as shown in the table at the left.

The invention will be fully understood from the following description and drawing. The drawing represents a diagrammatic view in sectional elevation of an apparatus adapted to carry out the process of the invention and indicates the flow of materials.

Either pure olefins or mixtures of olefins with saturated hydrocarbons are absorbed in acids of suitable strength (usually 60 to 80%) in accordance with the prior art. The reactive acid liquor so obtained is passed through pipe 1. At the beginning of the operation of this process the reactive acid liquor is divided into two equal parts and one part is passed through pipe 2, provided with valve 3, into a stripping tower 4. Water sufficient to dilute the acid liquor to 40 to 65% is added to hydrolyze the reactive acid liquor passed into the stripping tower 4 by means of pipe 5, provided with valve 6. The stripping tower 4 is operated to recover the alcohol from the extract by any method known to the art. The alcohol that has been formed is vaporized and removed through pipe 8.

The dilute acid, after removal of the alcohol, is passed to storage (not shown) through pipe 9, provided with valve 10. The other half of the reactive acid liquor is passed through pipe 11 into a reaction tower 12, where a temperature of about 80° to 130° C., preferably 100° C., and a pressure of 100 to 200 pounds per square inch is maintained.

Into this tower is also passed the alcohol vapors obtained from the stripping tower 4. A mixture of reactive acid liquor and recovered alcohol is maintained in this tower for about four hours, the temperature being controlled by means of steam coil 13.

The liquid from the reaction tower 12 is then passed through pipe 14, provided with valve 15, into a stripping tower 16, where the sulfuric acid is stripped and removed by means of pipe 17, provided with valve 18.

The separated alcohol and ether are passed through pipe 19 into fractionating tower 20, heated by means of steam coil 21. Ether is removed from the outlet 22 and condensed. The alcohol is removed from the bottom of the fractionating tower through pipe 23, and upon mixing with the reactive acid liquor returned to the reaction drum 12. When alcohol is being recovered from the fractionating tower 20, it is not necessary to use the stripper 4 to obtain any alcohol.

All of the reactive acid liquor is passed directly into the reaction tower 12, together with sufficient recovered alcohol from the fractionating tower 20 to dilute the acid to a concentration less than 65% sulfuric acid. When necessary, as a fine adjustment, additional water is admitted by pipe 24, provided with valve 25, to maintain the proper concentration. The amount of alcohol that is used to dilute the reactive acid liquor is always regulated so that a favorable high ratio of alcohol to acid is present.

Example 1

830 cc. extract (solution of propylene in 92% $H_2SO_4$) (mol ratio olefin to acid 1.3/1.0) and 1050 cc. isopropyl alcohol were heated overnight at 100° C. The pressure developed was 130 lbs.

Total alcohol in charge 1551 cc.
Recovered:
    668 cc. isopropyl ether
    782 cc. isopropyl alcohol
Conversion of alcohol to ether based on alcohol reacted=92.6%
Conversion of alcohol to ether based on alcohol charged=46.5%

Example 2

Charged:
    1420 cc. isopropyl alcohol;
    340 cc. 95% $H_2SO_4$
Heated overnight at 98–100° C. Pressure developed: 125 lbs. per square inch.

Recovered:
    477 cc. ether
    865 cc. alcohol
Conversion of alcohol to ether based on alcohol reacted=93.3%
Conversion of alcohol to ether based on alcohol charged=36.4%

Example 3

Charge:
    3380 cc. isopropyl alcohol
    400 cc. 95% $H_2SO_4$

This yielded a 30% effective acid with the mol ratio of alcohol to acid of 11.4; heated to 96° C. and developed a pressure of 250 pounds per square inch.

Recovered:
    800 cc. alcohol
    2100 cc. ether
Gas formed 2.7 cubic feet.
Conversion of alcohol to ether based on alcohol reacted=88.5%.
Conversion of alcohol to ether based on alcohol charged=67.5%.

Example 4

1000 cc. 71% acid extract (1 molar saturation)
700 cc. isopropyl alcohol
Heated to 100° C. for 4 hours. Pressure developed 130#/sq. in.
Total alcohol charged=1220 cc.
Recovered:
    298 cc. isopropyl ether
    872 cc. isopropyl alcohol
Conversion of alcohol to ether based on alcohol reacted=98%
Conversion of alcohol to ether based on alcohol charged=26.5%

The "effective" strength of the sulfuric acid is calculated on a basis of total water present as a diluent in the mixture, including both free water and water chemically combined in alcohol.

Alternately, if mixed ethers are to be produced, another alcohol than that present in the reactive acid liquor is added. It is not necessary to dilute the reactive acid liquor with the same alcohol which is present in the reactive acid liquor. The distillate therefrom obtained is fractionated in order to segregate the desired alcohol which is to be used to dilute the reactive acid liquor.

The concentration of sulfuric acid best adapted to form ethers is regulated by the temperatures and pressures used. Sulfuric acids at concentrations of 84% may be used as also may concentrations as low as 1%, but the temperatures and pressures must be varied accordingly. The pressure generally used is that which develops in the reaction. It is not necessary that alcohol alone be used for dilution, though it is preferred to do so. Water or water and alcohol may be used.

The foregoing description is merely illustrative and various changes and alternative arrangements may be made within the scope of the appended claims, in which it is our intention to claim all inherent novelty as broadly as the prior art permits.

We claim:

1. A process for manufacturing aliphatic ethers in which one alkyl group contains at least three carbon atoms which comprises reacting olefins with sulfuric acid of 60 to 80% concentration to form acid liquors, diluting the acid liquors with alcohols, holding the diluted acid liquors at a reacting temperature until substantially all the acid liquor is reacted, separating the products formed from the sulfuric acid and fractionating the products to obtain ethers and alcohols.

2. A process for manufacturing aliphatic ethers in which one alkyl group contains at least three carbon atoms which comprises reacting olefins with sulfuric acid of 60 to 80% concentration to form acid liquors, diluting the acid liquors with alcohols to reduce the effective strength of the sulfuric acid to between 40 and 65%, holding the diluted acid liquors at a reacting temperature and super-atmospheric pressure until substantially all the acid liquor is reacted, separating the products formed from the sulfuric acid and fractionating the products to obtain ethers and alcohols.

3. Process for manufacturing ethers according to claim 2 in which the separated alcohols are recycled to dilute the acid liquors.

4. A process for manufacturing aliphatic ethers in which one alkyl group contains at least three carbon atoms which comprises reacting olefins with sulfuric acid of 60–80% concentration to form reactive acid liquors, diluting the acid liquors with alcohol to 40 to 65% concentration, holding the said diluted reactive acid liquor in a closed system at a temperature above 50° C. under a pressure such as is developed until substantial equilibrium is reached, separating the sulfuric acid from the alcohol and ethers formed and fractionating the alcohols and ethers.

5. A process for manufacturing mixed aliphatic ethers in which one alkyl group contains at least three carbon atoms which comprises absorbing olefins in acids of 60–80% concentration to form acid liquors, diluting the acid liquors with alcohols other than those which could be predominantly produced from the said acid liquors, maintaining the diluted acid liquors at elevated temperatures and pressures until ether formation is substantially complete, separating the products from the said acids and fractionating the products to obtain mixed ethers and the alcohols.

6. A process for manufacturing mixed aliphatic ethers in which one alkyl group contains at least three carbon atoms which comprises reacting an olefin with sulfuric acid of 60–80% concentration to form acid liquors, diluting the acid liquors with alcohols other than those which could be produced from the said acid liquors to a concentration between 40 and 65%, maintaining the diluted acid liquors at elevated temperatures and super-atmospheric pressures until the ether formation is substantially complete, separating the products from the acids and fractionating the products to obtained mixed ethers and alcohols.

FRANCIS M. ARCHIBALD.
HELMUTH G. SCHNEIDER.